(12) United States Patent
Ansley (10) Patent No.: US 7,478,062 B2
(45) Date of Patent: Jan. 13, 2009

(54) FINANCIAL MANAGEMENT SYSTEM AND METHOD

(75) Inventor: Rebecca Anne Ansley, Westerville, OH (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1326 days.

(21) Appl. No.: 09/811,911

(22) Filed: Mar. 19, 2001

(65) Prior Publication Data

US 2002/0133437 A1    Sep. 19, 2002

(51) Int. Cl.
*G06Q 40/00* (2006.01)

(52) U.S. Cl. .......................... 705/35; 705/37

(58) Field of Classification Search ............. 705/35–37, 705/28, 14, 44
See application file for complete search history.

(56) References Cited

U.S. PATENT DOCUMENTS

| | | | | |
|---|---|---|---|---|
| 4,001,550 A | * | 1/1977 | Schatz | 235/379 |
| 4,305,059 A | * | 12/1981 | Benton | 705/43 |
| 4,341,951 A | * | 7/1982 | Benton | 705/41 |
| 4,523,087 A | * | 6/1985 | Benton | 235/379 |
| 4,536,647 A | * | 8/1985 | Atalla et al. | 705/70 |
| 4,625,276 A | * | 11/1986 | Benton et al. | 705/44 |
| 4,757,456 A | * | 7/1988 | Benghiat | 705/412 |
| 4,766,293 A | * | 8/1988 | Boston | 705/41 |
| 5,388,254 A | * | 2/1995 | Betz et al. | 714/16 |
| 5,485,507 A | * | 1/1996 | Brown et al. | 379/88.08 |
| 5,734,838 A | * | 3/1998 | Robinson et al. | 705/14 |
| 6,105,008 A | * | 8/2000 | Davis et al. | 705/41 |
| 6,311,167 B1 | * | 10/2001 | Davis et al. | 705/35 |
| 6,431,439 B1 | * | 8/2002 | Suer et al. | 235/380 |
| 6,611,849 B1 | * | 8/2003 | Raff et al. | 707/203 |
| 6,633,924 B1 | * | 10/2003 | Wu et al. | 719/328 |
| 6,763,336 B1 | * | 7/2004 | Kolls | 705/44 |
| 7,010,501 B1 | * | 3/2006 | Roslak et al. | 705/26 |
| 7,340,423 B1 | * | 3/2008 | Blagg et al. | 705/35 |
| 2002/0062278 A1 | * | 5/2002 | Ingram et al. | 705/39 |
| 2002/0116330 A1 | * | 8/2002 | Hed et al. | 705/39 |
| 2003/0191698 A1 | * | 10/2003 | Brown et al. | 705/28 |
| 2004/0122730 A1 | * | 6/2004 | Tucciarone et al. | 705/14 |

FOREIGN PATENT DOCUMENTS

WO    WO 95/21428    *    8/1995

OTHER PUBLICATIONS

Waite Maurice, "The Little Oxford Dictionary", Revised Seventh Edition, 1998, pp. 74-75.*

* cited by examiner

*Primary Examiner*—Narayanswamy Subramanian (57) ABSTRACT

A system and method of performing financial management tracking comprising entering, on a mobile control device, data associated with a financial transaction; storing said entered financial transaction data in a database within said mobile control device; periodically synchronizing said mobile control device database with a base station database via a communications link such that budgetary and financial transaction data is update. In one embodiment of the invention, each member of a household utilizes a separate mobile control device, each of the mobile control devices is synchronized with the base device such that all mobile control devices are synchronized with each other.

9 Claims, 6 Drawing Sheets

FIG. 2

*FIG. 3*
TRANSACTIONS
DATABASE FORMAT
300

| | TRANSACTION NUMBER 310 | DATE 320 | (∅=CASH) ACCOUNT NUMBER 330 | AMOUNT 340 | BUDGET ITEM IDENTIFIER 350 | IN BUDGET INDICATOR 360 | TRANSACTING ENTITY 370 |
|---|---|---|---|---|---|---|---|
| R1 → | 0023 | 1/21/01 | 56789 | $1500 | FUN | N | FATHER |
| R2 → | 0024 | 1/21/01 | 01234 | $2000 | MORT | Y | MOTHER |
| R3 → | 0025 | 1/25/01 | 01234 | $90 | HGAS | N | MOTHER |
| R4 → | 0026 | 1/26/01 | 56789 | $23.50 | CLOTH | Y | MOTHER |
| | ... | ... | ... | ... | ... | ... | ... |

FIG. 4
ACCOUNTS DATABASE FORMAT
400

| | ACCOUNT NUMBER (410) | TYPE (420) | INSTITUTION (430) | AVAILABLE BALANCE (440) | LAST UPDATED (450) | ACCESS LIMIT (460) | REPORTED BALANCE (470) | REPORT DATE (480) |
|---|---|---|---|---|---|---|---|---|
| R1 → | 01234 | CHECKING | FIRST BANK | $1 | 1/1/01 | MOTHER FATHER | $1' | 12/21/00 |
| R2 → | 56789 | CREDIT CARD | BIG BANK | $2 | 1/1/01 | MOTHER FATHER | $2' | 12/21/00 |
| R3 → | 7ABCD | CREDIT CARD | LITTLE BANK | $3 | 1/1/01 | MOTHER FATHER CHILD | $3' | 12/21/00 |
| | ... | ... | ... | ... | ... | ... | ... | ... |

FIG. 5
BUDGETARY DATABASE FORMAT
500

| | R1 | R2 | R3 | R4 | R5 | ... | R25 | R26 |
|---|---|---|---|---|---|---|---|---|
| | MORTGAGE | PROPERTY TAXES | HOME INSURANCE | GAS | ELECTRIC | ... | CLOTHING | ENTERTAINMENT |
| PERIODICITY | MONTHLY | QUARTERLY | ANNUALLY | MONTHLY | MONTHLY | ... | RANDOM | RANDOM |
| FIXED/VARIABLE | F | F | F | V | V | ... | V | V |
| PERIODIC BUDGET | $2000 | $300 | $50 | $80 | $80 | ... | $200 | $200 |
| ANNUAL BUDGET | $2400 | $1200 | $600 | $960 | $960 | ... | $2400 | $2400 |
| IDENTIFIER | MORT | PTAX | HINS | HGAS | EL | ... | CLOTH | FUN |

550 — PERIODICITY
540 — FIXED/VARIABLE
530 — PERIODIC BUDGET
520 — ANNUAL BUDGET
510 — IDENTIFIER

FIG. 6
600

FINANCIAL MANAGEMENT SYSTEM AND METHOD

BACKGROUND OF THE INVENTION

1. Field of the Invention

The present invention generally relates to the field of database management and, more particularly, to a system and method for tracking and updating financial transaction data.

2. Description of the Related Art

Most consumers utilize negotiable instruments such as personal checks to pay for desired goods and/or services. A book of checks (i.e., a check book) typically provides a bound group of sequentially related checks and a register for recording check number, payee, date and amount information relating to utilized checks. While useful in tracking available funds, the check book register provides no information relating to budget goals, application of checks towards particular budget items and similar financial management goals. Similarly, credit cards, debit cards and cash outlays provide no feedback to the user regarding budgetary and other financial management constraint other than "over limit" messages at a retail point-of-sale (POS) terminal, if applicable.

Financial management is regarded as a necessary task to be performed by each household. Unfortunately, since there are many ways to expend financial resources (as noted above), and many necessary expenses coming due at different times of the year (e.g., insurance, property tax and the like) as well as periodically occurring expenses having variable billing amounts (e.g., water, natural gas, communications and the like), coherent financial management strategies are often not practicable. Therefore, it is seen to be desirable to provide a system and method simplifying at least the data manipulation aspects of implementing appropriate financial management tasks.

SUMMARY OF THE INVENTION

These and other limitations associated with the prior art are overcome by the present invention of a financial management system and method providing integrated financial management and budgeting functions across one or more mobile control devices periodically synchronized with a base device.

A system and method of performing financial management tracking comprising entering, on a mobile control device, data associated with a financial transaction; storing said entered financial transaction data in a database within said mobile control device; periodically synchronizing said mobile control device database with a base station database via a communications link such that budgetary and financial transaction data is update. In one embodiment of the invention, each member of a household utilizes a separate mobile control device, each of the mobile control devices is synchronized with the base device such that all mobile control devices are synchronized with each other.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures.

DETAILED DESCRIPTION OF THE PREFERRED EMBODIMENT

The present invention will be described within the context of one or more handheld devices comprising at least a control program and a transactions database which are used contemporaneously with a financial transaction to enter parameters associated with that financial transaction to store parameters associated with that financial transaction in the transactions database. It will be appreciated by those skilled in the art that the mobile control device may be implemented using a personal digital system (PDA) or any other handheld computational device capable of being adapted to a data entry and data synchronization function.

Figure 1:
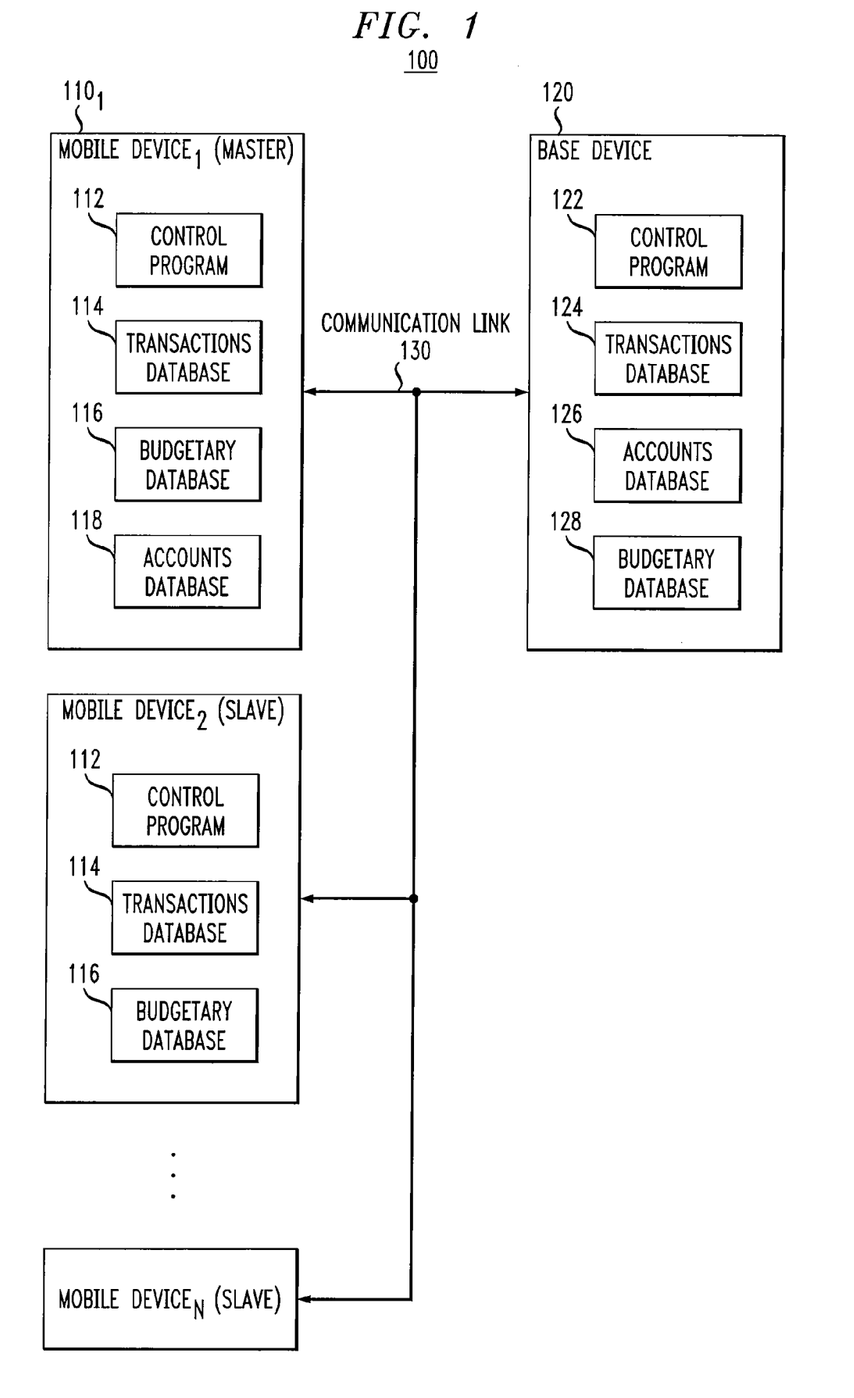
FIG. 1 depicts a high level block diagram of a financial tracking and management system.

FIG. 1 depicts a high level block diagram of a financial tracking and management system. Specifically, the system 100 of FIG. 1 comprises a plurality of mobile control devices $110_1$ through $110_N$ (collectively mobile control devices 110). Each of the mobile control devices 110 is operatively coupled on at least a periodic basis to base device 120 via a communications link 130. The base device 120 may comprise a personal computer or other computing device. The communications link 130 may comprise a serial communications link, parallel communications link, infrared (IR) link or any other medium suitable for transferring data between the mobile control device 110 and the base device 120. The mobile control device 110 will be discussed in more detail below with respect to FIG. 2. Briefly, the mobile control device 110 includes at least a control program 112 and a transactions database 114. The mobile control device 110 receives transactions data via, for example, a key pad (not shown) and stores the transactions data within the transactions database 114. The control program 112 compares the transactions data to various account parameters such as access parameters, account balance parameters and the like, as well as to various budgetary parameters. In the event of account comparisons or budgetary comparisons indicative of a predefined event, such as a budgetary over spending event or an account limit being exceeded, a message may be provided via an output device (not shown).

A system according to the invention may be implemented using a base device and a plurality of mobile control devices. The system may also be implemented using a plurality of mobile control devices where one of the mobile control devices operates as a master while the other mobile control devices operate as slaves to the master mobile control device. In either case, since the account information is quite sensitive, it is desirable to keep that information in as few mobile control devices as possible such that in the event of a mobile control device being lost or stolen the risk to the account holders is reduced.

Figure 2:
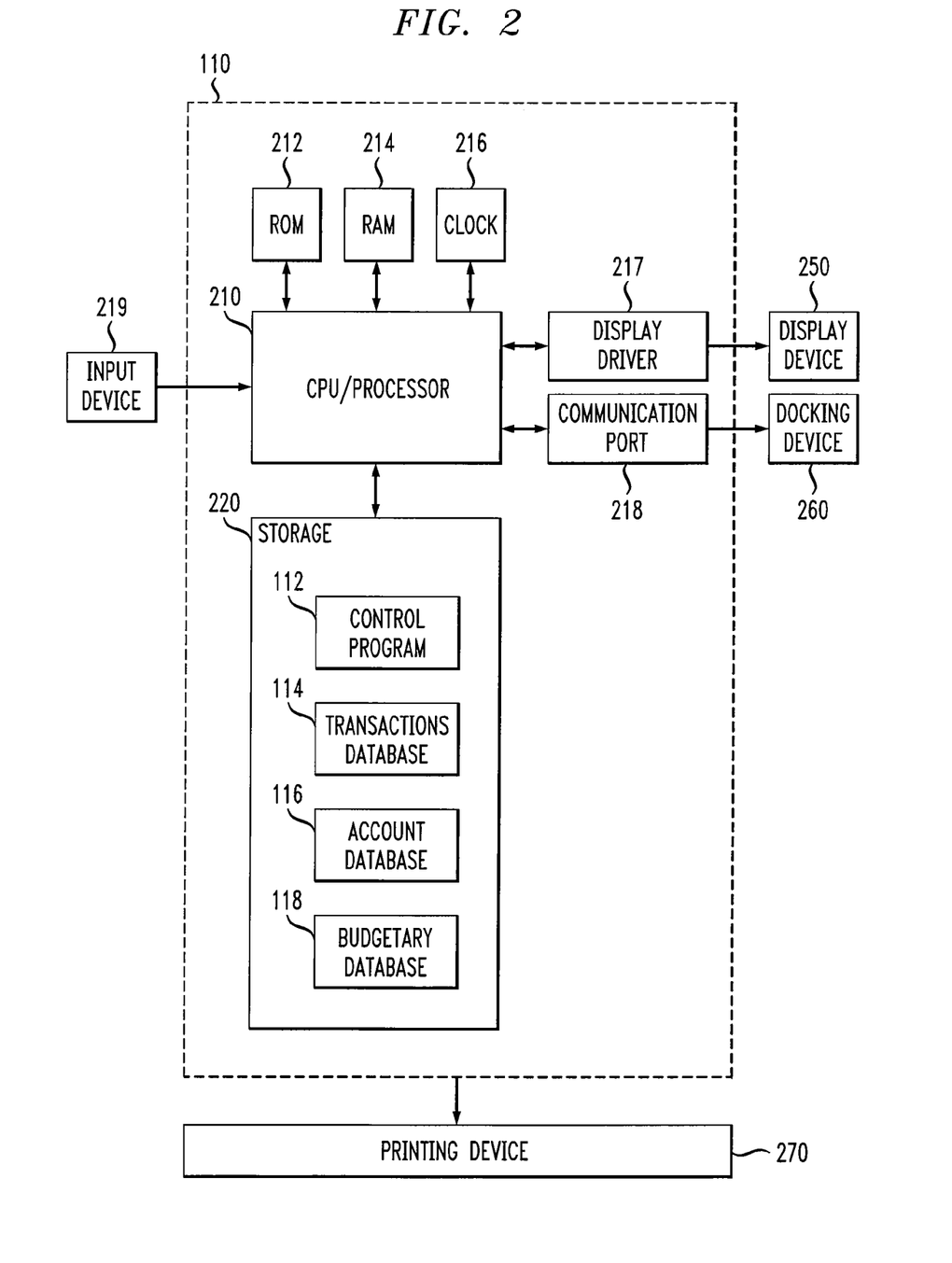
FIG. 2 depicts a high level block diagram of a control device suitable for use in the system of FIG. 1.

FIG. 2 depicts a high level block diagram of a control device 110 or 120 suitable for use in the system of FIG. 1. The control device 110/120 preferably includes certain standard hardware components, such as a central processing unit (CPU) 210, a data storage device 220, a read only memory (ROM) 212, a random access memory (RAM) 214, a clock circuit 216, a display driver 217, a communications port 218 and an input device 219.

The CPU 210 is preferably linked to each of the listed elements, either directly or indirectly, by means of a shared data bus, or dedicated connections, as shown in FIG. 2. The CPU 210 may be embodied as a single processor, or a number of processors, operating in conjunction with one another. The data storage device 220 and/or ROM 212 are operable to store one or more instructions, which the CPU 210 is operable to retrieve, interpret and execute. The CPU 210 preferably includes a control unit, an arithmetic logic unit (ALU) and a CPU local memory storage device, such as, for example, a stackable cache or a plurality of registers, in a known manner. The control device is operable to retrieve instructions from the data storage device 220 or ROM 212. The ALU is operable to perform a plurality of operations needed to carry out instructions. The CPU local memory storage device is operable to provide high speed storage used for storing temporary results and control information.

The display driver 217 cooperates with a display device 250, such as a liquid crystal display (LCD) display device, computer monitor, television or other display device.

The input device 219 comprises, illustratively, a keyboard, pointing device, voice recognition device, or on-screen data receiving device suitable for receiving input from a user. The input device 219 cooperates with the CPU 210. In a preferred embodiment of the invention, the input device 219 and display device 250 are integrated using a touch screen device operable via a stylus.

The data storage device 220 typically includes one or more machine readable media; such media includes, as is well known in the art, magnetic, semiconductor and/or optical media. Data storage device 220 is preferably capable of supporting the searching and storing of data. Preferably, data storage device 220 comprises a low cost, low energy consumption semiconductor device.

The data storage device 220 preferably includes a control program 112, a transactions database 114, an account database 116 and a budgetary database 118. The control program 112 stores a plurality of instructions which, when retrieved and executed by the CPU 210, cause the control device 110/120 to operate as a special purpose device implementing the system and method of the present invention. The transactions database 114 preferably includes transaction specific data pertaining to transactions input to the control device by a user (e.g., via the input device 219) or from another control device during a synchronization operation. The transactions database 114 will be discussed in more detail below with respect to FIG. 3. The account database 116 preferably includes account specific data pertaining to account number identification, account type, available balance and other related information. The budgetary database 118 preferably includes budgetary related data pertaining to specific budget items to which funds must be allocated, the likely amount of funds needed to satisfy the budget item, the periodicity of payments to satisfy the budget item and similar information. The account database 116 will be discussed in more detail below with respect to FIG. 4, while the budgetary database will be described in more detail below with respect to FIG. 5.

Referring to FIG. 2, an optional printing device 270 is shown. The optional printing device 270 is capable of printing a negotiable instrument such as a personal check. The optional printing device 270 may communicate with the CPU/processor 210 via the communications port 218 or via any other communication means known to those skilled in the art. The operation of the printing device 270 may be inhibited in cases where a contemplated financial transaction exceeds one or more budgetary constraints. Optionally, the inhibited operation of the printing device may be overridden by the transacting entity. For example, an override code may be entered by the person using a mobile device or other computing device having associated with it the printing device 270 of FIG. 2.

Figure 3:
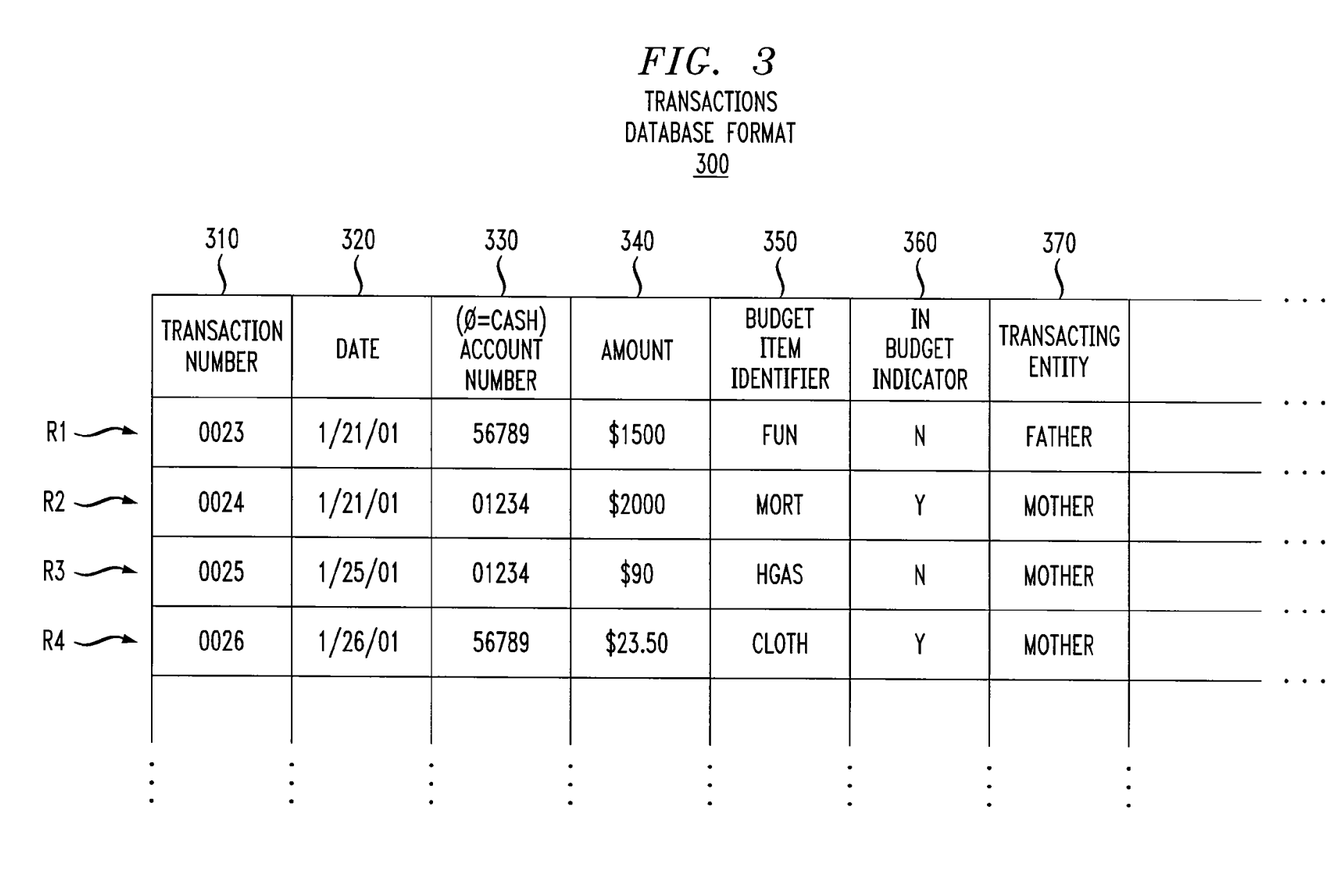
FIG. 3 depicts a representation of an exemplary transactions database used in accordance with the principles embodied in the present invention.

FIG. 3 depicts a representation of an exemplary transactions database used in accordance with the principles embodied in the present invention. It is understood that the various rows and columns illustrated as comprising the databases in this figure represent records and fields, respectively. Thus, in each of the various described embodiments, the databases are used in a relational arrangement, as is known in the art, so that databases relate to one another by way of fields that store common pertinent data. It is known that while the following description refers to specific individual databases, formats, records and fields, those skilled in the art will readily appreciate that various modifications and substitutions may be made thereto without departing from the spirit and scope of the present invention. It is noted that the above understanding is also applicable to the below description of the accounts database 400 and budgetary database 500 of, respectively, FIGS. 4 and 5.

The transactions database 300 stores data relating to individual transactions recorded using a control device such as the mobile control device 110 or base control device 120 depicted above in FIGS. 1 and 2. Each record (or row) of the transactions database 300 is maintained for a single recorded transaction. By way of example, four transaction records (R1-R4) are shown in FIG. 3; each transaction being identified by a unique transaction number 310. Each record comprises a plurality of fields.

Field 310 is a transaction number field, used to store an identification number corresponding to the transaction number within a sequence of transactions. Field 320 is a date field indicating the date of the transaction. Field 330 is an account number field, indicating the account against which the transaction is debited or credited. In the case of a cash transaction, a null or zero account number is entered. Field 340 is an amount field indicating the amount of the transaction. Field 350 is a budget item identifier field, indicating the budgetary item (which will be described later with respect to FIG. 5) associated with the particular transaction. Field 360 is an in budget indicator field, indicative of whether the transaction value is within the budgeted value allocated for the identified budget item in field 350. Field 370 is a transacting entity field identifying the transacting entity associated with the transaction.

Referring to FIG. 3, the first record R1 indicates that transaction number 0023 occurred on Jan. 21, 2001. The account number associated with this transaction was 56789 which, per the accounts database 400 (discussed below with respect to FIG. 4) is a credit card account with an institution named "BIG BANK." The transaction amount of record R1 was $1,500, which was allocable to the "FUN" budget identifier. This transaction was not within the allocated budget and was executed by a transacting entity identified as "FATHER."

The transaction database 114 within a mobile control device 110, and the transactions database 124 within a base control device 120 are formed substantially in accordance with the transactions database 300 of FIG. 3. Each control device updates its local transactions database in response to locally input user data and in response to data received during a synchronization operation.

Figure 4:
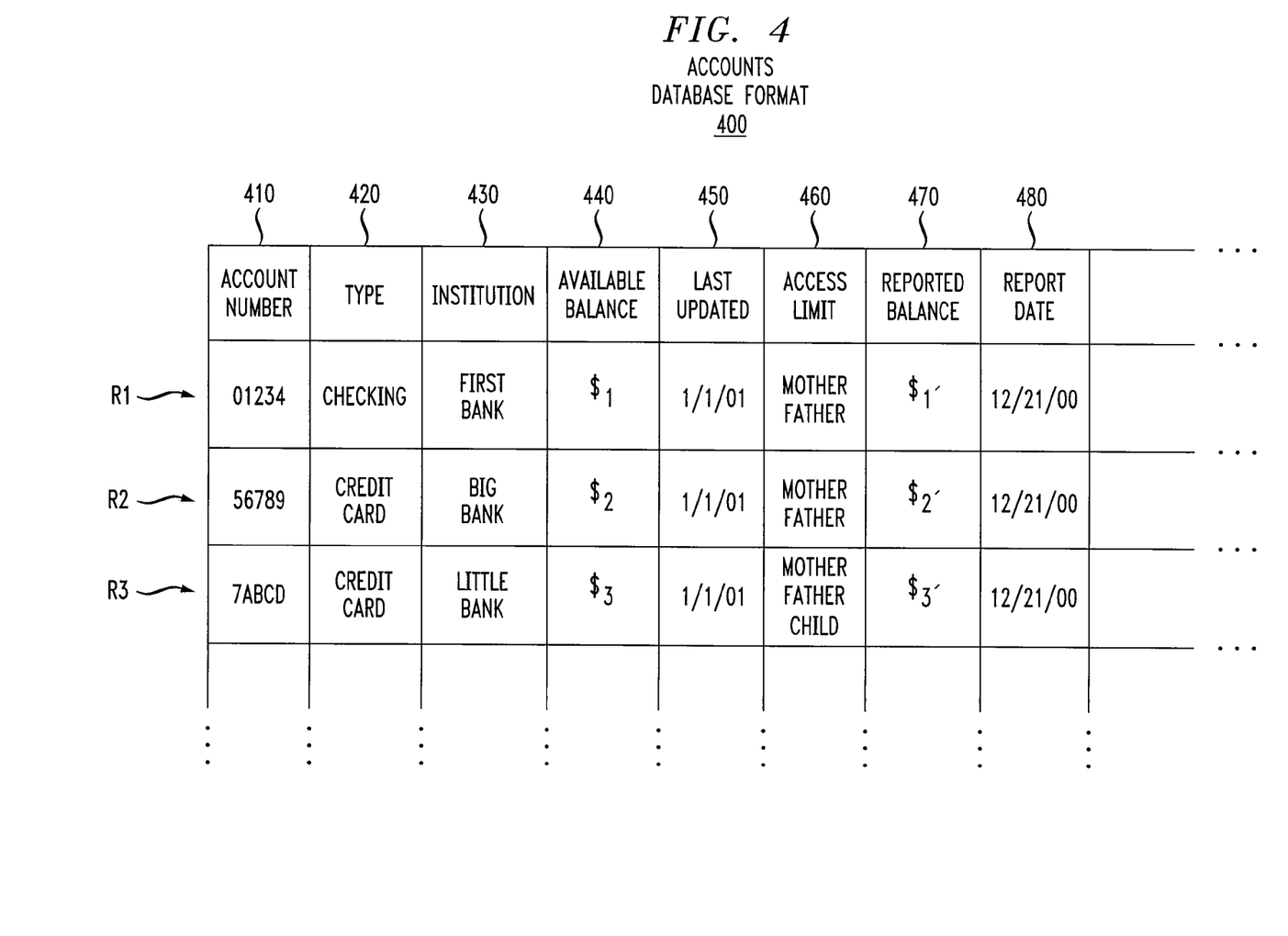
FIG. 4 depicts an exemplary accounts database used in accordance with the principles embodied in the present invention.

FIG. 4 depicts an exemplary accounts database used in accordance with the principles embodied in the present invention. The accounts database may be stored in each of the mobile 110 or base 120 control devices depicted above with respect to FIGS. 1 and 2. Alternatively, the accounts database may be stored in either the base device 120 or a master mobile control device $110_1$.

The accounts database 400 stores data relating to accounts that are maintained for the transacting entities within the system. Each record (or row) of the accounts database 400 is maintained for each account available to the transacting entities. By way of example, three account records (R1 through R3) are shown in FIG. 4. Each record comprises a plurality of fields.

Field 410 is an account number field, used to store an account number. Field 420 is a type field, used to store data indicative of the type of account associated with the particular record. Account types may comprise, for example, checking accounts, savings accounts, credit card accounts, money market accounts, retirement accounts and other accounts known to those skilled in the art.

Field 430 is an institution identifier field, used for storing at least the name of the institution (e.g., banking or other financial services institution) responsible for serving the identified account. Field 440 is an available balance field, used to indicate a balance of a checking or savings account, an amount of credit available in a credit card account, and similar data related to other account types. Field 450 is a last updated field, used to store the date and, optionally, time of when the account information was last updated. Account information is updated by synchronizing the various control devices such that account usage is properly metered and available balances are adjusted in accordance with the recorded transactions. Field 460 is an access limit field used to store the identification of those to whom account access is granted.

Field 470 is a reported balance field, used to store the last actual balance associated with the account identified in field 410. This balance is reported by the institution identified in field 430. Field 480 is a report data field, used to store the date and, optionally, the time when the last reported balance was provided.

By way of example, the first record R1 identifies account number 01234 as a checking account with first bank having an available balance of $\$_1$. Data associated with this record was last updated on Jan. 1, 2001. The transacting entities entitled to access this account are MOTHER and FATHER. The last reported balance from the institution for this account was $\$_1$, and the reporting date was Dec. 21, 2000.

Figure 5:
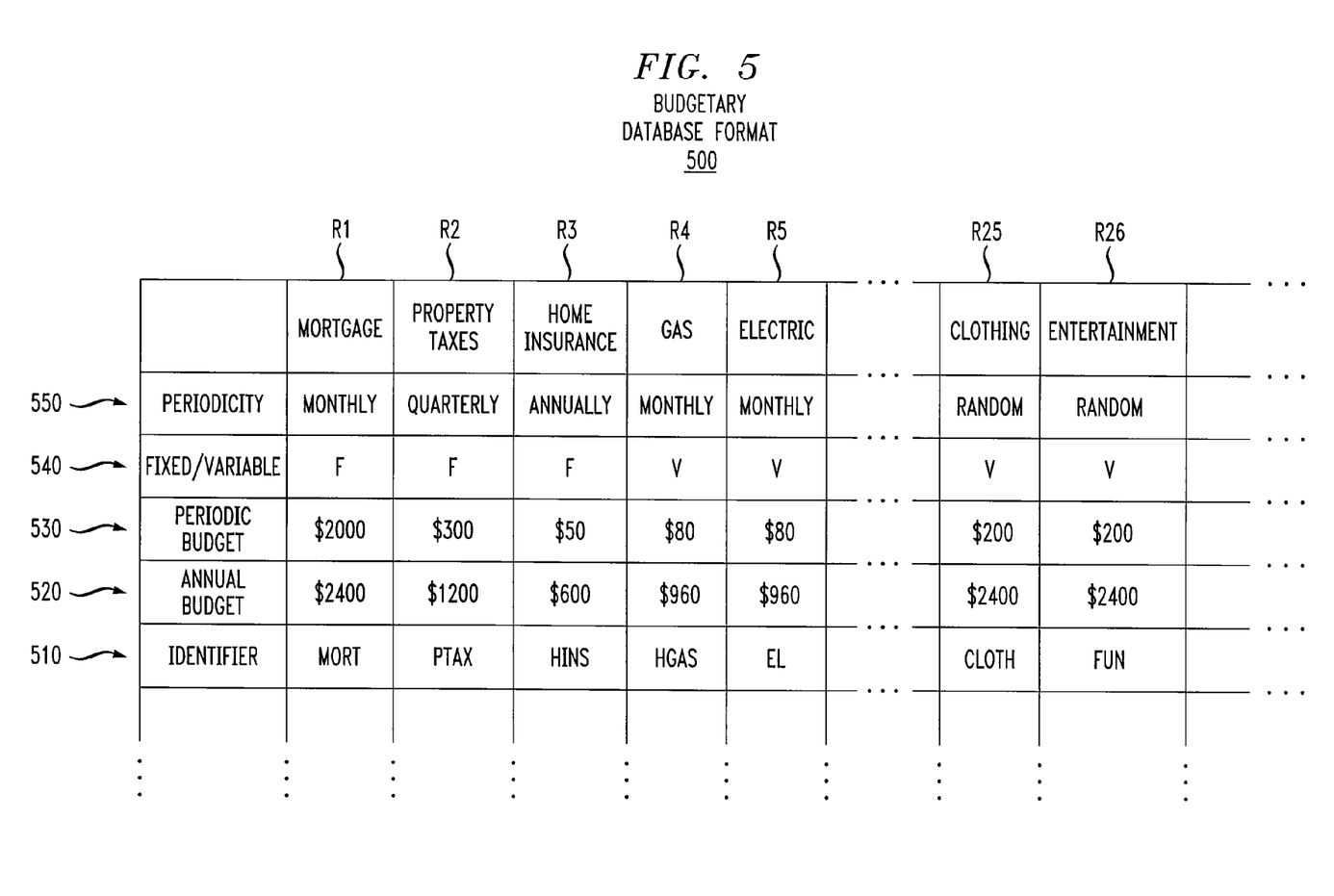
FIG. 5 depicts an exemplary budgetary database used in accordance with the principles embodied in the present invention.

FIG. 5 depicts an exemplary budgetary database used in accordance with the principles embodied in the present invention. The budgetary database 500 of FIG. 5 stores data relating to various budgetary items and the amount of funding allocated to these items. It is noted that the budgetary database 500 of FIG. 5 depicts a plurality of records R1 through R26 as columns, and a plurality of fields 510 through 550 as rows. Each record comprises a plurality of fields.

Field 510 is an identifier field, used to store an identifier associated with the budgetary item corresponding to the particular record. In FIG. 5, the following budgetary items and identifiers are used: mortgage, MORT; property taxes, PTAX; home insurance HINS; gas, HGAS; electric, EL; clothing, CLOTH; entertainment, FUN; and so on.

Field 520 is an annual budget field, used to store a dollar (or other currency) amount indicative of the expected or allocated annual budget associated with the budgetary item identified in field 510. Field 530 is a periodic budget field, used to store a dollar amount to be paid periodically in support of the budgeted item. Field 540 is a fixed/variable field, used to indicate whether the identified budgetary item is a fixed or variable cost item. It will be appreciated that some budgetary items, such as property taxes, are adjusted annually though fixed costs otherwise. Field 550 is a periodicity field, used to indicate the time period between payments associated with the identified budgetary item. For example, the first record R1 indicates a mortgage of $24,000 per year is paid on a monthly basis at a budgeted rate of $2,000.

Figure 6:
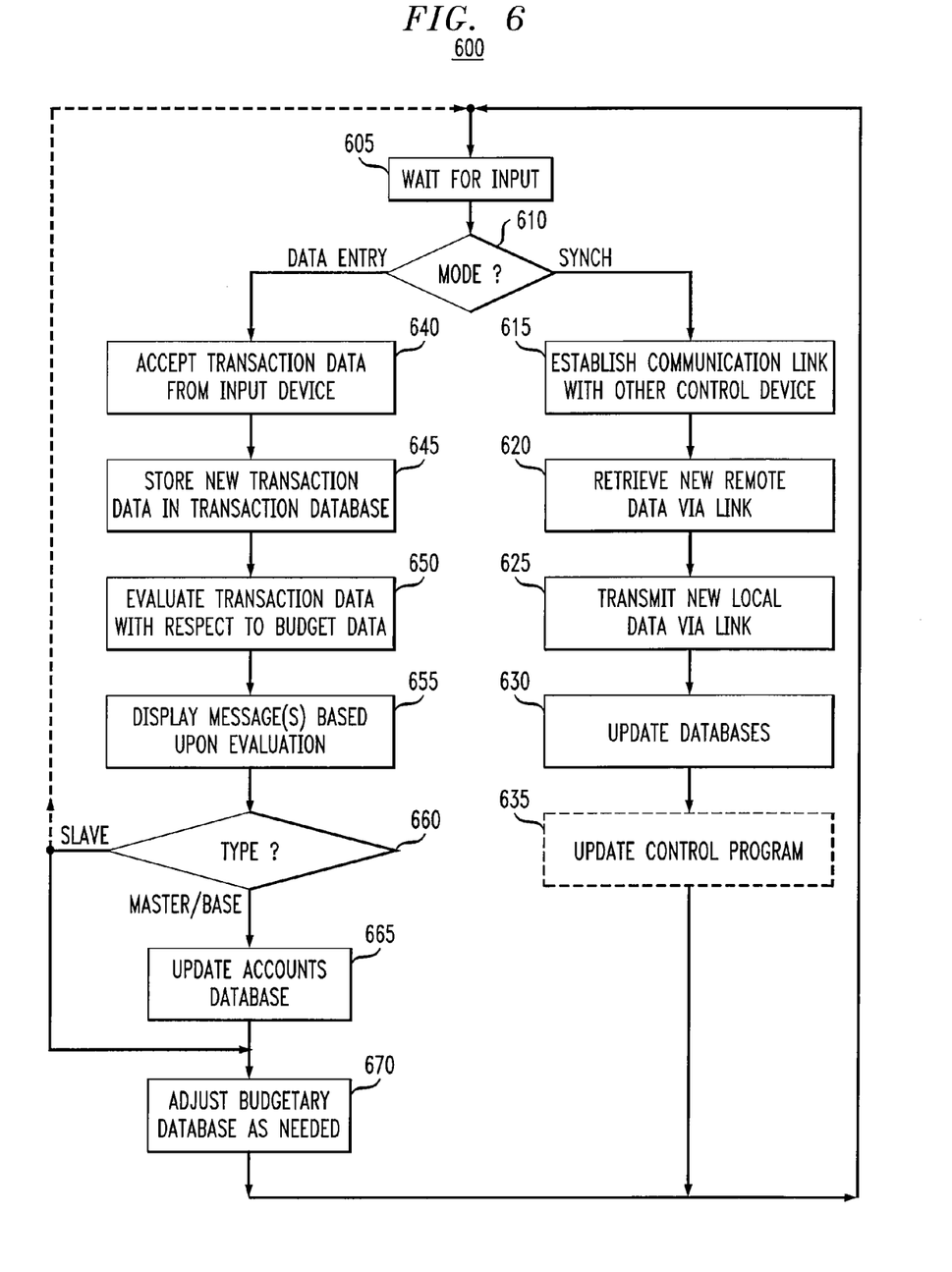
FIG. 6 depicts a flow diagram of a method for tracking and managing financial information.

FIG. 6 depicts a flow diagram of a method for tracking and managing financial information. Specifically, FIG. 6 depicts a method 600 suitable for use in either a base control device, a master mobile control device or a slave mobile control device, such as described above with respect to FIGS. 1 and 2. The method 600 is stored within the memory of the control device, retrieved and executed by the CPU to perform the steps described below.

The method is entered at step 605 where the control device waits for input. Upon receiving an input via, for example, an input device such as a keyboard or, preferably, a stylus contacting a touch screen, the method proceeds to step 610.

At step 610, a query is made as to the appropriate mode for the control device to enter. If the input is indicative of a data entry, then the method 600 proceeds to step 640. If the input is indicative of a synchronization operation, then the method 600 proceeds to step 615.

In the case of a synchronization operation, at step 615 a communication link is established between the control device within which the method is operating and another control device. It is noted that the other control device may also be operating according to the method 600 of FIG. 6. A communication link is established via, for example, the communication link 130 described above with respect to FIG. 1. Known hand shaking and/or session initiation techniques may be used to establish bi-directional communication between two or more control devices.

At step 620, new remote data is retrieved via the communications link. That is, at step 620, data within the other control device that was entered into the other control device after the last synchronization operation is retrieved. At step 625, new local data is transmitted to the other control device via the communications link. That is, at step 625, data within the local control device that was entered or generated after the last synchronization operation is uploaded to or transmitted to the other control device.

At step 630, the databases of the local control device are updated with the new remote data retrieved at step 620. While not shown, the other control device or devices synchronize with the local control device to update their databases in response to the new local data transmitted at step 625.

Optionally, at step 635, the local control program 112 within the control device executing the method 600 is updated or otherwise modified based upon control program data retrieved along with new remote data at step 620. The method 600 then proceeds to step 605 to wait for the next user input.

In the case of a data entry operation, at step 640, transaction data from the input device is accepted. At step 645, the new transaction data accepted at step 640 is stored in the transaction database 114 of the control device 110/120.

At step 650, the transaction data is evaluated with respect to the budget data stored within the budgetary database 116. For example, in the case of new transaction data indicative of spending beyond a budgetary limit, spending on non-approved items, spending against non-authorized accounts and the like, one or more user messages may be generated. At step 655, the messages based upon evaluation at step 650 are displayed on the display device. For example, in the case of an unauthorized expenditure, a message indicating that such expenditure is not authorized may be displayed. This message may be overridden by the user and the expense made anyway.

At step 660, a query is made as to the type of control device performing the method 600 of FIG. 6. If the control device is a master mobile device or base device, then at step 665 an accounts database is updated. The method 600 then proceeds to optional step 670. If the control device is a slave type of device, which does not include an accounts database, then the method 600 proceeds to step 670. If the control device is a slave type of device that also does not include a budgetary database, then the method 600 proceeds to step 605 to wait for the next user input.

At optional step 670, the budgetary database stored within the control device operating the method 600 is adjusted as needed. For example, in the case of an evaluation at step 650 indicating an overspending condition for a particular budgetary item, the budgetary data associated with that item may be adjusted at step 670 to better reflect the spending requirements associated with that budgetary item. Other budgetary adjustments may be made including the addition or deletion of categories or items, and, generally, modifications to any of the items discussed above with respect to the budgetary database 500 of FIG. 5.

In one embodiment of the invention, each of the mobile devices 110 comprises a personal digital assistant (PDA) operating using, illustratively, the PALM, Windows CE or other operating system. It is noted that PALM is a trademark of Palm Incorporated of Santa Clara, Calif. and that Windows CE is a trademark of Microsoft Corporation of Redmond, Wash. Each of the mobile devices includes a transactions database 114 that is updated in response to respective data entry manipulations. In addition, each mobile device includes a budgetary database 116 that stores information useful in determining whether transaction information is within budgetary guidelines. The base device 120 comprises a computer system such as a personal computer having associated with it a docking station which mechanically and electrically receives mobile devices 110 and facilitates the data interchange and database updating operations described above. Optionally, one or more of the mobile devices 110 may comprise an accounts database.

In an alternate embodiment of the invention, a first PDA operates as a master control device, while at least one other PDA operates as a slave control device. The PDA operating as a master control device includes a control program 112, a transactions database 114, a budgetary database 116 and an accounts database 118. The slave device(s) do not include an accounts database.

In one embodiment, the slave devices also do not include a budgetary database. In this embodiment, the slave devices only serve to receive transaction data, which transaction data is then processed by the master control device to evaluate whether transactions entered on the slave device are appropriate to the budgetary constraints defined by the budgetary database 500.

In one embodiment, a computing device according to the invention includes a printing means capable of printing a negotiable instrument such as a personal check. Upon a user entering transaction data associated with a presently contemplated transaction, in the case of a comparison of the transaction data to the budgetary data where an over budget or other indication of exceeding a budgetary constraint is determined, the negotiable instrument printing function is inhibited. This inhibited function may optionally be overridden by the user.

While the foregoing is directed primarily to the preferred embodiment of the present invention, other and further embodiments of the invention may be devised without departing from the basic scope thereof, and the scope thereof is determined by the claims that follow.

The invention claimed is:

1. A method, comprising:
  storing, in at least one database within a portable first computing device, financial transaction data and budgetary data, wherein said budgetary data comprises a plurality of budgetary data records, each budgetary data record comprising a budgetary item identifier field and at least one of an annual budget field and a periodic budget field, wherein said financial transaction data and budgetary data stored in said at least one database of said portable computing device is periodically synchronized with financial transaction data and budgetary data stored in at least one corresponding database within a second computing device;
  evaluating said transaction data using said budgetary data to determine at least whether a transaction value exceeds a budgetary constraint for a transaction, wherein said budgetary constraint is determined from one of the budgetary data records identified via the budgetary item identifier field of the one of the budgetary data records using a budgetary item identifier of the transaction, wherein said budgetary constraint comprises at least one of an annual budget and a periodic budget determined from the respective annual and periodic budget fields of the one of the budgetary data records;
  displaying, upon a display device, a message indicative of the results of said evaluation, said displayed message indicative of whether said transaction is appropriate with respect to said budgetary constraint.

2. The method of claim 1, further comprising:
  generating, at one of said first and second computing devices operating as a master computing device, a report indicative of transaction patterns associated with at least said first and second computing devices.

3. The method of claim 1, further comprising:
  storing, in one of said first computing device and second computing device, accounts data including information pertaining to accessible financial accounts, said accounts database providing available credit or debit amounts to update said budgetary data during said step of synchronizing.

4. The method of claim 3, wherein said accounts data comprises a plurality of records, each record comprising at least an account number field, an account type field, an institution field and an available balance field, said account number field identifying a credit or debit account, said account type field identifying the type of account, said institution field identifying the financial institution associated with said account, and said available balance field identifying an available balance or credit limit associated with said account.

5. The method of claim 1, wherein said transaction data comprises a plurality of records, each record comprising at least an account number field, a transaction amount field and a budgetary item identifier field, said account number field identifying a credit or debit account funding a respective transaction, said transaction amount field identifying the value of said respective transaction, said budgetary item identifier field identifying the type of said respective transaction.

6. The method of claim 5, wherein each transaction data record further comprises a budget indicator field for indicating whether said respective transaction is appropriate with respect to a corresponding budgetary constraint.

7. The method of claim 5, wherein a transacting entity utilizing one of said first and second computing devices inputs transaction data contemporaneous to effecting said transaction, said displayed message indicating to said transacting entity whether said respective transaction should proceed.

8. The method of claim 1, wherein the budgetary database further comprises a periodicity field and a fixed/variable payment field.

9. The method of claim 1, further comprising:
in the case of an evaluation indicative of exceeding a budgetary constraint, said displayed message is indicative of said budgetary constraint being exceeded.

* * * * *